UNITED STATES PATENT OFFICE.

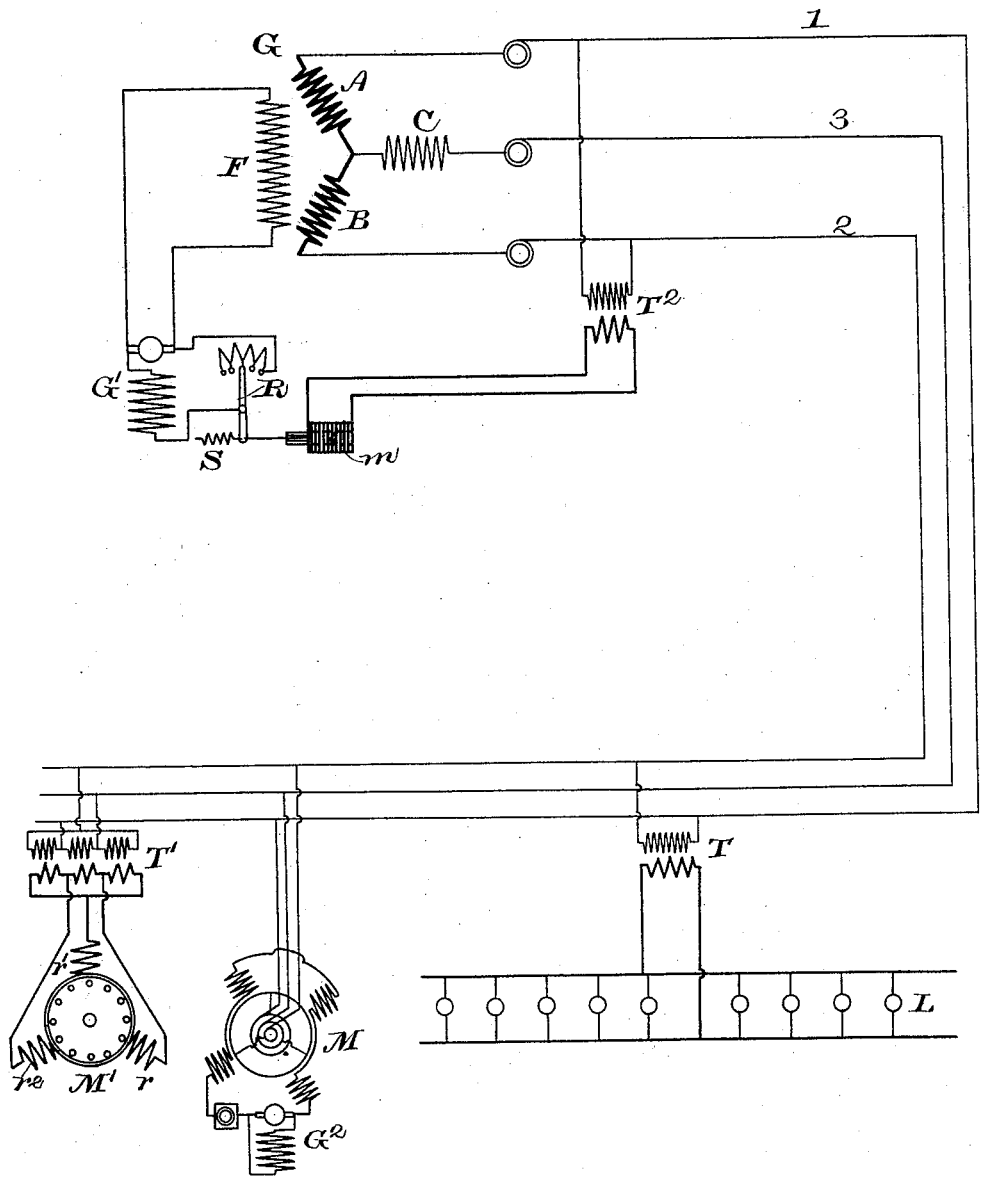

EDWIN W. RICE, JR., OF SWAMPSCOTT, MASSACHUSETTS, ASSIGNOR TO THE GENERAL ELECTRIC COMPANY, OF NEW YORK.

ALTERNATING-CURRENT SYSTEM.

SPECIFICATION forming part of Letters Patent No. 556,865, dated March 24, 1896.

Application filed January 24, 1894. Serial No. 497,893. (No model.)

*To all whom it may concern:*

Be it known that I, EDWIN W. RICE, Jr., a citizen of the United States, residing at Swampscott, in the county of Essex and State of Massachusetts, have invented a certain new and useful Improvement in Alternating-Current Systems, of which the following is a specification.

The aim of my present invention is to provide a satisfactory and inexpensive alternating-current system of generation and distribution resembling in character both a single-phase system and a multiphase system. In fact, the invention may be regarded as a combination of the two systems in a common one, since only a single generator is required and a common system of mains. The generator is so organized as to deliver single-phase currents, or, when desired, multiphase currents to appropriate external circuits. There are two mains comprising what I term a "single-phase" circuit, with which are coupled the lamps or other single-phase translating devices. For multiphase work there is an additional main or mains, through which jointly with the single-phase mains multiphase currents are fed to desired translating devices. For convenience I will refer to the mains as constituting a single-phase circuit and a multiphase circuit. With such an arrangement the translating devices operate in the same manner as if the circuits were independent, and the single-phase system is susceptible of the ready and exact regulation necessary to insure proper burning of the lamps. The novel features of the invention deal chiefly with the construction of the dynamo and means of regulation, which will now be explained.

The preferred dynamo has three armature-windings arranged to generate currents one hundred and twenty degrees apart in phase, and in this respect is similar to the ordinary three-phase dynamo. Two of these windings have their free terminals connected to the single-phase mains and deliver thereto single-phase currents. These are the only active windings when there are no multiphase-translating devices in circuit, and for single-phase work they take the place in my system of the usual single-phase generator. The remaining armature-winding is connected with the third main of the multiphase circuit and becomes active when multiphase motors or other like translating devices are working on the system. This coil is wound with wire of different section from the others, since it is designed to carry current for the multiphase translating devices only, while the other two windings carry current for both classes of translating devices.

The means of regulation comprise a potential magnet or other potential responsive device connected in circuit with the single-phase mains and suitable regulating mechanism for the dynamo whose action is controlled by this responsive device. The claims made herein for the regulator are intended to be generic, since different types of regulating mechanism may be employed, and the dynamo may be automatically governed in a similar manner, though the construction enabling it to deliver single and multi phase currents is different from that specifically set forth. The regulation also may be manual rather than automatic.

In the accompanying drawing there is shown a distribution system illustrating clearly one embodiment of the invention.

In the drawing, G is a generator whose field-coils F are energized by a separate direct-current generator G'. The armature of the main generator is provided with three windings A B C, occupying such positions with reference to the field of force as to generate currents one hundred and twenty degrees apart. All three windings have one terminal connected to a common joint. The free terminals of coils A B are connected respectively to mains 1 and 2, forming the single-phase circuit, while the third coil, C, is connected to an intermediate main, 3, which, in conjunction with mains 1 and 2, forms a three-phase circuit. A group of lamps L in parallel are coupled in circuit with the single-phase mains, either directly or through a transformer T. As an example of a multiphase translating device, a three-phase motor M of the synchronous type is shown with its armature connected with the three mains 1 2 3, while its field is magnetized by a separate direct-current generator $G^2$. A three-phase induction-motor M' is also shown connected with the three mains by three transformers T, which are coupled in circuit in a manner now well known in the art and represented in the drawing, in such order that three secondary currents, one hundred and twenty degrees apart in phase, are fed to the three field-energizing coils $r\ r'\ r^2$. This motor has a closed-circuit armature. With this arrangement it will be understood that the coils A and B of the dynamo generate currents for the single-phase as well as the multiphase translating devices, while the remaining coil C carries only that current which is required for the multiphase translating devices. Hence I wind this third coil with wire of smaller section than that used in the other coils, and proportioned according to the current demanded in any given installation.

To regulate the single-phase circuit I provide a magnet $m$, which is coupled in circuit either directly or through a transformer $T^2$ with the mains 1 and 2. The core of this magnet is connected to a rheostat-arm R, which cuts in or out more or less resistance in the circuit of the field-coils of the exciter and so controls the magnetizing-current circulating in the field-coils of the main dynamo. A retractile spring S is also connected to the rheostat-arm, counterbalancing the action of the magnet.

What I claim as new, and desire to secure by Letters Patent, is—

1. An electro-dynamic machine of the three-phase type having its different armature-coils wound with wire of different sections corresponding to the strength of current they are designed to generate, as and for the purpose set forth.

2. A dynamo of the three-phase type having two of its armature-coils designed to generate the same strength of current and wound with wire of the same section, but having its third coil designed to generate a current of less strength wound with wire of smaller section, as and for the purpose set forth.

3. A three-phase dynamo having two of its coils connected to mains feeding single-phase translating devices, and its third coil connected with an additional main which, together with the single-phase mains, feeds multiphase translating devices, such armature-coils being wound with wire of different section corresponding to the strength of current they are designed to carry, as described.

4. The combination of a dynamo-electric generator having a three-phase winding connected to corresponding mains constituting multiphase and single-phase circuits, with means for regulating the generator so as to preserve the desired potential or current conditions in the single-phase circuit, as set forth.

5. The combination of a dynamo-electric generator having a three-phase winding adapted to deliver current to mains constituting both a single-phase and multiphase circuit, with a regulator for the dynamo, and a device responding to changes of potential on the single-phase circuit for controlling the action of the regulator, as set forth.

6. The combination of a dynamo-electric generator having a winding so disposed and connected as to generate and deliver currents to single-phase and multiphase circuits and a regulator for the dynamo responding automatically to changes of potential in the single-phase circuit, as set forth.

In testimony whereof I have hereto set my hand this 20th day of January, 1894.

EDWIN W. RICE, Jr.

Witnesses:
JOHN W. GIBBONEY,
BENJAMIN B. HULL.